(12) United States Patent
Kim

(10) Patent No.: US 8,810,783 B1
(45) Date of Patent: Aug. 19, 2014

(54) FIBER FAULT SNIFFER

(71) Applicant: Fluke Corporation, Everett, WA (US)

(72) Inventor: Wonoh Kim, Johns Creek, GA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 13/755,402

(22) Filed: Jan. 31, 2013

(51) Int. Cl.
*G01N 21/00* (2006.01)
*G01M 11/00* (2006.01)

(52) U.S. Cl.
CPC ............ *G01M 11/30* (2013.01); *G01M 11/335* (2013.01)
USPC ........................................... 356/73.1

(58) Field of Classification Search
CPC ................................................. G01M 11/3145
USPC ...................... 356/73.1, 402; 324/25; 606/194
See application file for complete search history.

(56) References Cited

U.S. PATENT DOCUMENTS

| | | | |
|---|---|---|---|
| 5,485,084 A * | 1/1996 | Duncan et al. ................ 324/225 |
| 5,809,185 A * | 9/1998 | Mitchell ......................... 385/12 |
| 7,826,043 B1 | 11/2010 | Urban et al. | |
| 2005/0190873 A1 * | 9/2005 | Smith et al. ................... 375/354 |
| 2008/0247430 A1 * | 10/2008 | Zhang et al. ................... 372/34 |
| 2011/0145747 A1 * | 6/2011 | Wong et al. ................... 715/771 |
| 2012/0039062 A1 * | 2/2012 | McBee et al. ................. 361/825 |
| 2012/0271339 A1 * | 10/2012 | O'Beirne et al. ............. 606/194 |

OTHER PUBLICATIONS

Trilithic optical leak detector TFS-FS1 brochure, Trilithic, Inc., Indianapolis, IN, publication date unknown, possibly Apr. 22, 2010.
Blackbox FX3 Fiber Fault Finder Gun brochure, Black Box Corporation, Lawrence, PA, publication date unknown, possibly Sep. 7, 2010.
JDSU FI-60 Live Fiber Identifier brochure, JDS Uniphase Corporation, Milpitas, CA, publication date unknown, possibly Mar. 2011.
EXFO LFD-300B/TG-300B FiberFinder brochure, EXFO Inc., Quebec, Quebec, Canada, publication date unknown, possibly Apr. 2011.

* cited by examiner

*Primary Examiner* — Tarifur Chowdhury
*Assistant Examiner* — MD Rahman
(74) *Attorney, Agent, or Firm* — Edwards Wildman Palmer LLP; Scott D. Wofsy; Christopher J. Capelli

(57) ABSTRACT

A fault detector for fiber optic cabling is provided in a hand held device for detecting fiber faults, presence/absence of signal and wavelength of light present on an optical fiber. Audible and visual indicators of the fault/status and wavelength are provided.

6 Claims, 3 Drawing Sheets

FIBER FAULT SNIFFER

BACKGROUND

This disclosure relates to fiber optic cable testing, and more particularly to a hand held fault locating device for use with fiber optic cable testing.

Defects in fiber optic cables degrade the performance of the signal. Considering fiber as a pipe of communication signals, low output and defects in the fiber means there is a leaking point. Current devices for detecting fiber leakage are large and expensive, making them impractical for use in certain situations. For example, detecting fault in closed tight spaces such as communication closets and behind walls, or along fiber risers in data centers, requires a small tool that can easily fit in hand.

SUMMARY

In accordance with the disclosure, a hand held fiber fault detection tool is provided in the form of an inexpensive, easy to carry, pen-shaped device that detects and alerts user of defects in the fiber. The device can also detect whether the line carries live signals or no signal.

Accordingly, it is an advantage of the present disclosure to provide an improved fault locater device for use with fiber optic cables It is a further advantage of the present disclosure to provide an improved method and apparatus to detect and report fiber optic cable properties.

It is yet another advantage of the present disclosure to provide an improved fiber optic cable testing tool that detects faults and provides a visual and/or audible report of the results.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

DETAILED DESCRIPTION

The system according to a preferred embodiment of the present disclosure comprises a hand held device that contains a photodiode and microprocessor to detect and analyze the signal on the surface of a fiber optic cable. By scanning on the skin of fiber optic cable with the tip of the device, the microprocessor analyzes the pattern of the signal and alerts the user when it detects an abnormal signal (defect).

Figure 1:
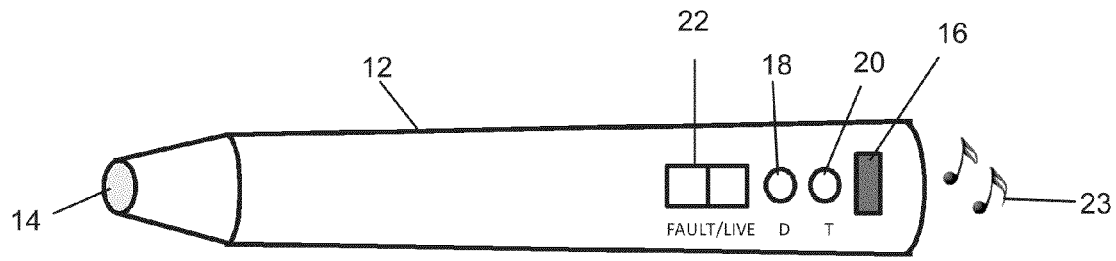
FIG. 1 is a view of a hand held device in accordance with the disclosure.

Referring now to FIG. 1, a representation of a hand held device in accordance with the disclosure, the device 10 comprises a pen-like instrument body 12 having a sensor end 14, an operational mode switch 22 may be provided for switching between live signal detection mode, for the purpose of detecting whether a fiber is carrying live signals, or fault detection mode, for determining the presence of faults in the cable or connectors, a detect operation button 18, a training operation mode button 20, and a LED 16 for providing visual indication of test results. LED 16 may comprise, for example, a tri-color LED to indicate live (as in green color) or dead (as in amber) if the live signal detection mode is selected in operational mode switch 22 or to indicate fault (as in amber) or normal (as in green) if fault detection mode is selected in operational mode switch 22. An audio generation element, such as a speaker, may also be provided in the device for generating audible signals 23 to report results. Not visible in FIG. 1, a lens may be provided at the sensor end 14, internal to the device, for focusing the signal to the internal detection components.

Figure 2:
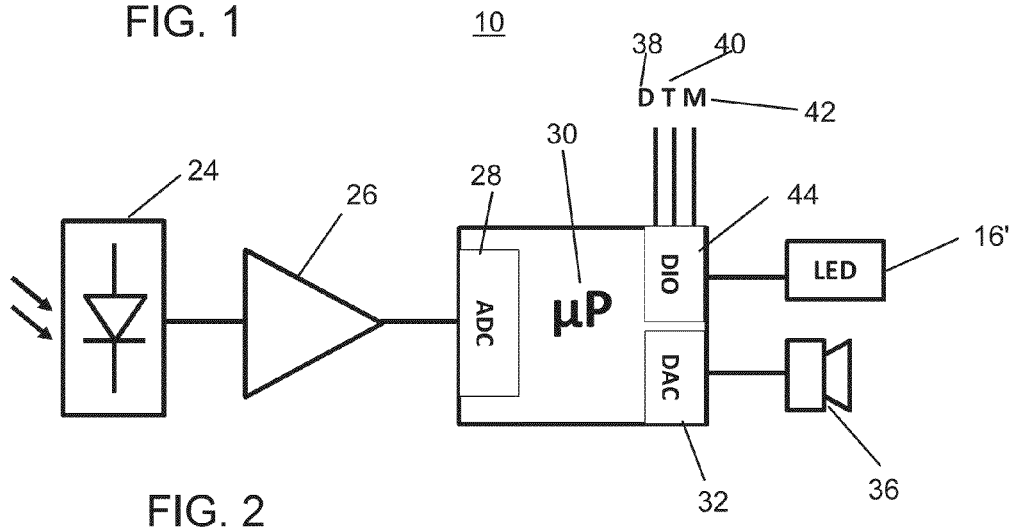
FIG. 2 is a block diagram of the functional components of the device of FIG. 1.

FIG. 2 is a block diagram of the functional components of the device of FIG. 1, wherein a photo diode 24 is connected via amplifier 26 to an A to D converter 28 (ADC). A microprocessor 30 receives the output of ADC 28, and provides input to digital to analog converter 32 (DAC). The DAC 32 drives speaker 36 to provided detection reports in audible form or operational information. Detect control 38, training control 40 and mode control 42 (which may suitably comprise switches 18, 20, and 22) provide input to DID (Digital Input Output) 44, which drives LED 16' (and in the configuration of FIG. 8, display 60).

In operation a mode switch 42 in FIG. 2 (and 22 in FIG. 1) is operated to set the operation mode between live signal detection or fault detection mode.

If set to live signal detection mode by operation of the mode switch to the detection mode, the device operates as a signal detection device, wherein input from photo diode 24 is supplied via amplifier 26 to ADC 28. If a sufficient level of optical signal is detected, then the microprocessor 30 sends a signal to DIO 44 to illuminate the 'live' mode of LED 16', and also to generate a sound via speaker 36, supplied an output signal from DAC 32. LED 16' is implemented in a particular embodiment as a tri-color LED, wherein, for example, the color green is displayed to indicate that the device is detecting a live signal, or the color red is displayed to indicate that no signal is being detected. In the case where the LED 16' is provided as separately illuminated segments, the 'live' portion segment would be illuminated. Audible signals may also be provided via the speaker to report test results, for example, a 'whimpering' sound may be generated to indicate that no live signal is detected on the fiber optic cable.

When the device is set to fault detection mode, by operation of the mode switch, the device detects faults in the signal detected on the surface of the fiber optic cable. This fault may be determined based on drop off or increase of signal level of the detected signal, for example. In the fault detection mode, the LED 22 is driven to a color, for example, green, when no faults are being detected, and changes to a different color, for example, red, when a fault is detected. In the case where the LED 16' is provided as separately illuminated segments, the 'fault' portion segment would be illuminated. Further, an audible signal such as a 'woof! woof!' sound may be generated via speaker 36 when a fault is detected. The fault/live detection may also be provided as separate portions of an LED section, or as separate LEDs.

To train or calibrate the device, the training button 20 is depressed, while the sensor tip is held to or moved along a cable with a known acceptable non-fault signal, and the LED 16' is illuminated in a color to represent training mode, such as amber. The acceptable signal level is then stored by the microprocessor and used in later testing to compare against, and any significant variation therefrom being determined to be an indication of a fault.

Thus, a hand held device is provided to search for faults on fiber optic cables.

Figure 3:
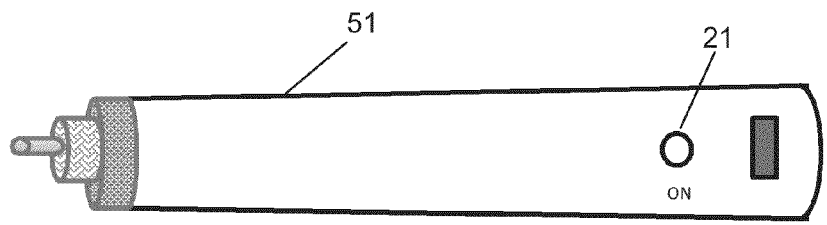
FIG. 3 is a view of a hand held device that provides an optional specific wavelength light source.
Figure 4:
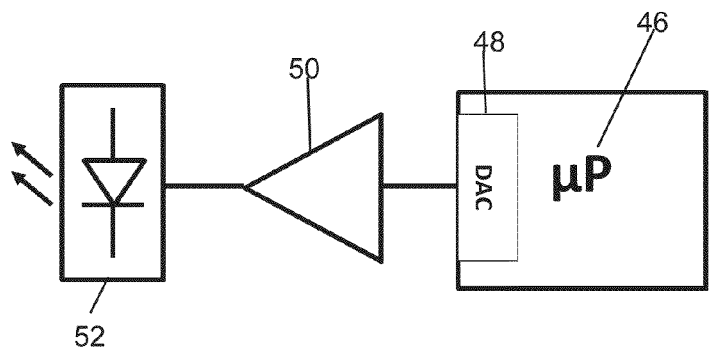
FIG. 4 is a block diagram of the optional specific wavelength light source of FIG. 3.

Additional embodiments or options may be provided. A version or versions with separate (or unified) sources and sensors for generating and detecting different wavelengths of light may be provided. Referring to FIG. 3 and FIG. 4, a representation of a hand held device for providing different wavelength optical test signals and a block diagram of the device for providing different wavelength optical test signals for applying to a fiber optic cable under test, power on switch 21 activates a microprocessor 46 which generates a test signal which supplied via DAC 48 and amplifier 50 causes light emitter 52 (suitably an appropriate wavelength LED), to generate an optical signal, which may then be provided to the fiber under test. Separate optical source probes 51 containing the light emitter 50 are available, provided in different colors to the exterior case of the probe to assist in identifying which wavelength of light the particular probe is designed for, designed for typical communication light wavelengths. Suitable example colors are black probe for visible light, red probe for 1625 nm, orange probe for 1550 nm, green probe for 1310 nm and blue probe for 850 nm. These colors are provided as particular examples, and different color schemes may also be employed. Alternatively, plural sources 52 may be provided in a single hand held probe to generate multiple wavelengths of light, either simultaneously or selectively one or more at a time.

Figure 5:
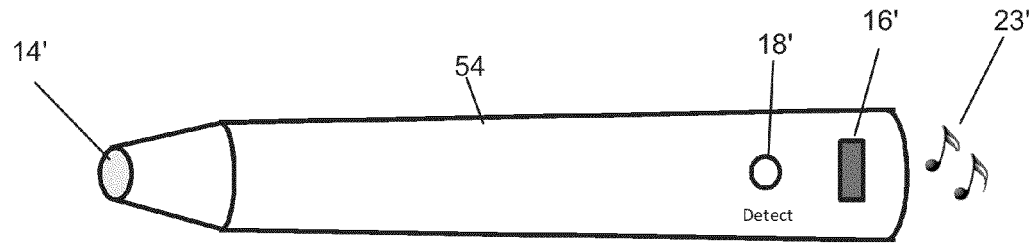
FIG. 5 is a view of a hand held device that provides an optional specific wavelength light sensor.
Figure 6:
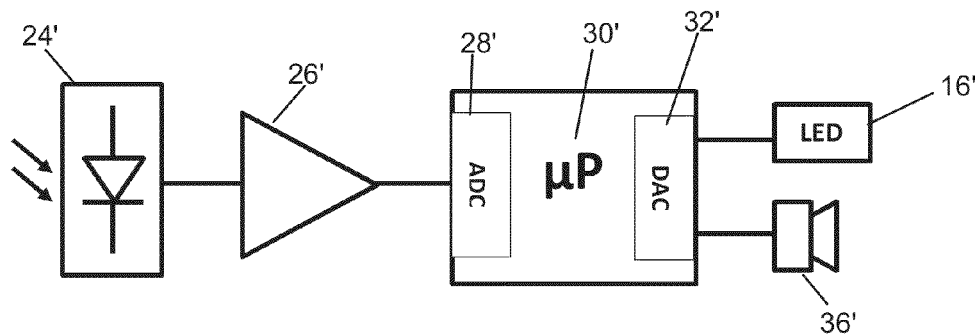
FIG. 6 is a block diagram of the optional specific wavelength light sensor of FIG. 5.

A more simplified detector 54 is illustrated in FIGS. 5 and 6, wherein a detector 24' is provided in a case 54, with a detect LED 16' and an audible indicator 23'. The detector 24' supplies ADC 28' via amplifier 26', and the microprocessor 30' detects the presence of signal, illuminating the LED 16' and operating the speaker 36' via DAC 32' when signal is detected.

Figure 7:
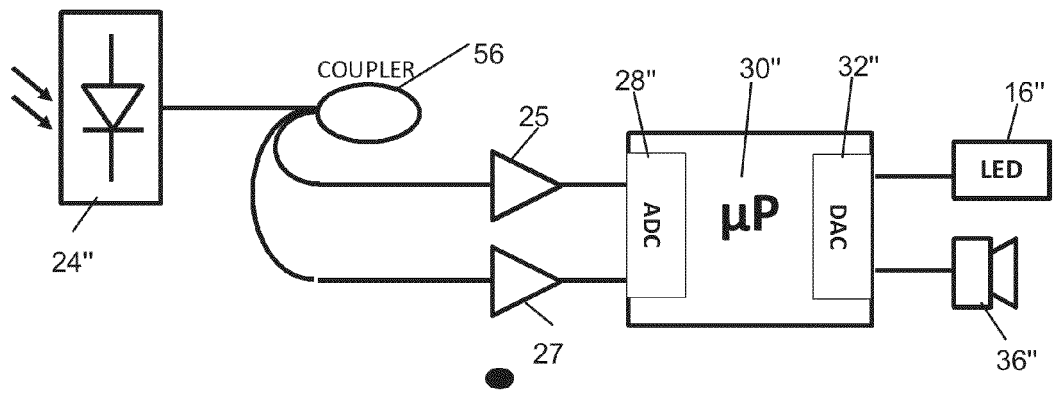
FIG. 7 is a block diagram of an alternative multiple wavelength light sensor.
Figure 7:
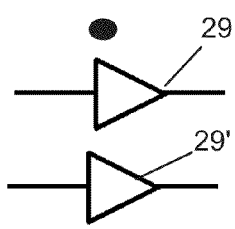

An embodiment of the tester designed to detect different wavelength of light is shown in FIG. 7, wherein a detector 24" (which may be configured as a hand held probe 54') is connected via a coupler 56 to amplifiers 25, 27 (and additional optional amplifiers, 29, 29' . . . ), supplied via ADC 28" to microprocessor 30". The microprocessor controls LED 22" and speaker 36" via DAC 32", and illuminates the LED 16" in different colors to indicate the wavelength of light that has been detected, which is particularly useful for multiple wavelength detection in a single probe. Different audible signals may be generated via speaker 36" depending on the detected wavelength, such as the following example detection scenarios:

1625 nm detected, red LED, 4 beeps via speaker
1550 nm detected, orange LED, 3 beeps via speaker
1310 nm detected, green LED, 2 beeps via speaker
850 nm detected, blue LED, 1 beep via speaker In operation the amplifiers 25, 27, 29, etc. provide detection at the specific individual wavelengths, the number of such amplifiers 25, 27, 29, 29', etc. depending on the number of different wavelengths that are to be detected, 4 such amplifiers being provided in the illustrated embodiment to detect 1625 nm, 1550 nm, 1310 nm and 850 nm.

Figure 8:
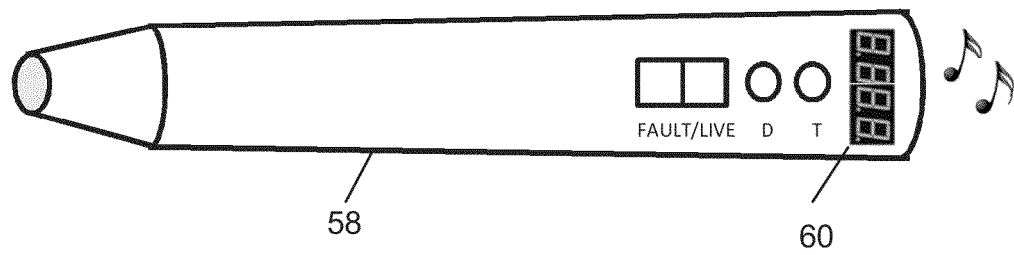
FIG. 8 is a view of an alternative hand held device that provides additional data display.

FIG. 8 illustrates an alternate hand held probe body 58, that includes a display 60, suitable for displaying additional information, for example, fault codes, such as 0 for normal; 1 for unusually high signal (which might be caused by leaking); 2 for weak signal (indicating leaking at other locations); 3 for no signal; 4 for unknown error; etc.

Accordingly, multiple embodiments are provided of an optical fiber cable fault detector that provides detection of whether a cable is carrying live signal, detection of faults in the fiber, and detection of signal wavelengths. A multiple wavelength test signal source is also provided with interchangeable wavelength source probes.

While plural embodiments of the technology have been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. A method for detecting faults on fiber optic cables, comprising:
    providing a hand held probe having a photo detector, the hand held probe configured to receive an optical signal by scanning an outer surface of a fiber optic cable, the photo detector configured to convert the optical signal into an electrical signal;
    providing a coupler receiving the electrical signal from the photo detector;
    providing a plurality of amplifiers receiving the electrical signal from the coupler wherein each amplifier is configured to detect a unique wavelength of light for the received optical signal, via the received electrical signal, relative to the other amplifiers of the plurality of amplifiers;
    providing an analog to digital converter receiving the electrical signal from the photo detector plurality of amplifiers; and
    providing a processor receiving digital signals from the analog to digital converter, said processor detecting live signals and faults based thereon;
    providing an audible indicator connected to the processor for indicating test results, said audible indicator presenting audio signals representative of:
    the detected wavelength;
    a detected live signal;
    absence of a live signal, wherein each audio signal for each said detected wavelength, a said detected live and absence of live signal is distinct relative to one another; and
    providing a visible indicator connected to the processor for indicating test results, said visible indicator presenting visible signals representative of:
    the detected wavelength;
    a detected live signal; and
    absence of a live signal, wherein each visible signal for each said detected wavelength, a said detected live and absence of live signal is distinct relative to one another.

2. The method according to claim 1, further comprising:
    providing a visible indicator connected to the processor for indicating test results.

3. The method according to claim 2, wherein said visible indicator comprises a tri-state indicator.

4. The method according to claim 3, wherein said tri-state indicator indicates green for a detecting mode, amber for a training mode and red for a fault/no live signal test result.

5. The method according to claim 1, further comprising:
 providing an audible indicator connected to the processor for indicating test results.

6. The method according to claim 1, further comprising providing a wavelength detector for detecting presence of specific wavelength optical signals.

\* \* \* \* \*